Jan. 6, 1948. LE ROY S. SAYRE 2,433,926
VENDING CONTAINER
Filed May 28, 1945
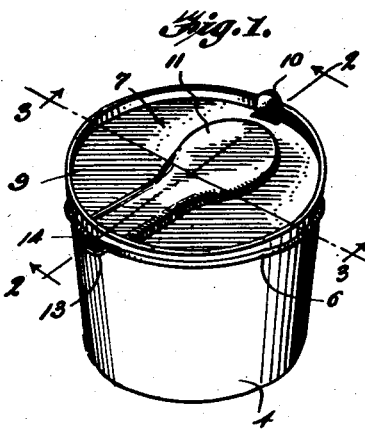
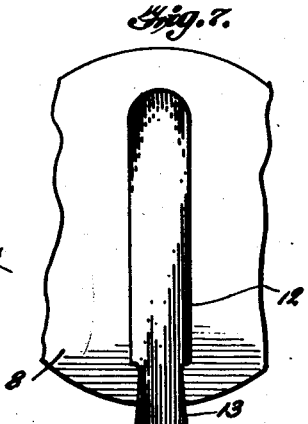
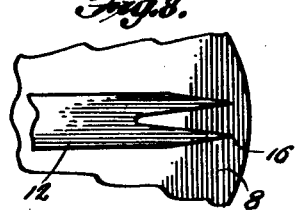
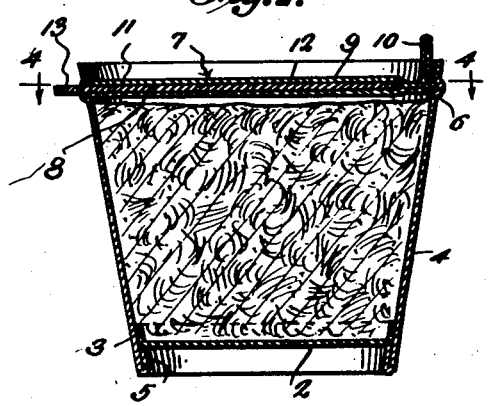
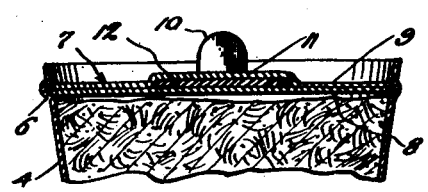
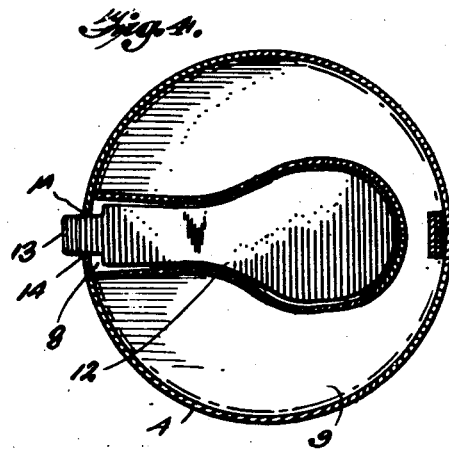
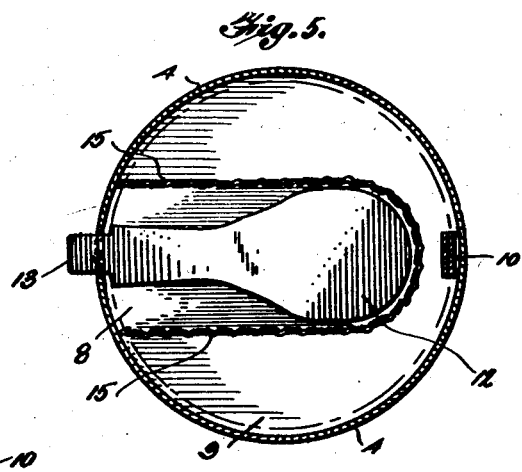
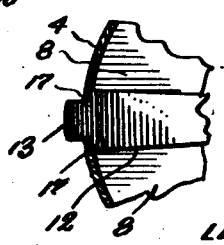
INVENTOR
LEROY SHERMAN SAYRE
Randolph & Beavers
BY ATTORNEYS Patented Jan. 6, 1948

2,433,926

UNITED STATES PATENT OFFICE 2,433,926

VENDING CONTAINER

Le Roy S. Sayre, Stuttgart, Ark.

Application May 28, 1945, Serial No. 596,329

6 Claims. (Cl. 229—1.5)

This present invention relates to a container and more particularly to a dispensing or vending cup for ice cream or other ices or confections of like nature.

The primary purpose of the invention is the preservation of the contents of the cup in a sanitary condition.

Another object is the design of an inexpensive cup which is sturdy and provided with a bottom securely held to the rest of the cup and is at the same time so constructed that the contents of the container may be removed from the same after removal of the lid by inversion of the cup and slight tapping on the bottom.

A further object is the design of a cup which may be closed after filling by a lid firmly interlocked with the rest of the cup and removable therefrom without great effort.

A still further object is the design of a cup equipped with a dispensing utensil and holding the latter prior to the opening of the container in a position and condition which makes the contamination of the utensil impossible. The very appearance of the cup and the utensil stored therein is an assurance to the prospective purchaser that the contents and utensil going with the cup are in the best sanitary condition for consumption.

Still another object of the invention is the design of an economical and completely sanitary package fulfilling the above standards and requirements and adapted for almost any kind of food, such as cheese spreads, butter, jellies and jams, relishes, fruit sauces and meat spreads.

With these and other objects in view the invention consists in the novelty of construction, combination and arrangement of parts described in detail in the following description and claimed in the appended claims.

The description should be read in connection with the accompanying drawing in which:

Figure 1 is a perspective view of the preferred embodiment of my invention;

Figures 2 and 3 are central, diametral and vertical sections on line 2—2 and 3—3 of Figure 1 respectively the latter view being broken away;

Figure 4 is a horizontal section on line 4—4 of Figure 2;

Figure 5 is a horizontal section analogous to Figure 4 of a modification;

Figure 6 is a vertical detail section analogous to Figure 3 through another modification;

Figure 7 is a modified form of the dispensing utensil;

Figure 8 is a further modification of the utensil;

Figure 9 is a modification of the handle portion of the utensil.

In the drawings in which like reference characters designate like or similar parts, Figures 1–4 illustrate the preferred form of my invention which includes a bottom 2 having an upwardly diverging or conical flange 3. This bottom is inserted in the lower end portion of a conical container wall 4 which diverges upwardly to the same extent as the bottom flange and has its bottom end turned inwardly to form a flange 5. The free upper edge of the latter supports the bottom 2 (Figure 2). This construction has the advantage that the bottom is securely held in the lower downwardly converging end of the container wall. Another advantage lies in the fact that the container may be emptied of its contents by mere inversion and a slight tap on the bottom.

The container wall which has a conventional seam (not shown) is provided near its upper edge with a bead 6 defining an external peripheral bulge and internal groove for receiving the peripheral margin of a top 7 or lid structure now to be described and constituting one of the features of the present invention.

This lid comprises a bottom disk 8 of circular form and a size to fit with its marginal portion in the groove described. Upon the bottom disk rests a top disk 9 having at its circumference a radially disposed tab 10 which is folded at the middle upon itself and extends at right angles to the upper surface of the lid and substantially parallel to the adjacent wall portion rising above the bead 6. As seen in Figure 2, the tab 10 is formed of two plies, one of which forms an integral extension of each disk 8 and 9. The diametral portion of the top disk in alignment with the tab is deformed with respect to the remainder of the top disk with a view of providing a pocket for a dispensing utensil still to be described. The deformation takes the form of an outward bulge 11 of an outline conforming substantially to the outline of the utensil (Figure 4). The undeformed, flat portion of the top disk is firmly cemented to the bottom disk by the use of any suitable adhesive. The pocket provided by the adjacent diametral portions of the two disks is open at one end opposite to the tab.

The dispensing utensil 12 may have various shapes. In the preferred form of Figures 1–4 such shape comprises an oval portion merging into a handle with substantially parallel sides and an end section 13 of reduced width adapted for insertion in a slot 14 of corresponding length and extending parallel to the top and bottom surfaces of the container. After filling the latter with ice cream or other food the section 13 of the handle attached to and between the disks forming the lid is inserted in the slot 14 and the lid is pressed into the open upper end of the filled container until the marginal peripheral edge of the lid snaps into the internal groove of the bead 6. To remove the lid the user grips the tab, lifts the lid and extracts the handle from the slot 14. The dispensing utensil may then be extracted from its pocket by tearing the bulging portion of the top disk from the remainder of the lid. Thus the user finds himself in possession of a dispensing utensil which he knows to be free from contamination and this knowledge will certainly enhance the pleasure experienced in eating the ice cream. I do not restrict myself to any particular material for the container or utensil. Paper is the preferred material for the former and wood for that of the latter.

Figure 5 is a modification of the construction of the pocket for the utensil. The bulge 11 formed in the top disk is wider at the handle portion of the utensil and its outline or contour is formed by a series of perforations 15 so that the utensil may be removed from the pocket by tearing the bulging portion off the remainder of the top disk along the line of perforations.

In Figure 6 is shown a dispensing utensil 12 of lentil-shaped cross-section enclosed between the two disks.

In Figure 7 the dispensing utensil is formed from a strip of material of uniform substantially rectangular cross-section and one end thereof is rounded while the opposite or handle end 13 is of reduced width.

In Figure 8 the dispensing end 16 of the utensil is shaped like a fork.

Figure 9 shows a utensil the reduced handle portion 13 of which extends entirely into or beyond the slot of the container. The transverse shoulders 17 formed by the reduced portion are slightly rounded to conform to the inner curvature of the upper end portion of the container.

Any of the various modifications of the utensil described above and illustrated in the appended drawing may be combined with any form of the pocket or lid disclosed.

While I have described in detail several embodiments of my invention one of which is directed to a combination between the cup, lid and dispensing utensil while others are directed to the pocket for the latter or to the utensil alone, I desire it to be understood that these embodiments are mere examples, not limitations of my invention, and that changes or modifications may suggest themselves to those skilled in the art without departing from the spirit and scope of the invention as expressed in the appended claims.

What I claim and desire to secure by Letters Patent is:

1. A container of the class described comprising a hollow body portion closed at the bottom and interiorly grooved adjacent its open upper end, a removable lid having a peripheral margin inserted in the groove and provided with a pocket having an end opening outwardly of said margin, and a dispensing utensil in the pocket.

2. A container comprising a hollow body portion closed at the bottom, a removable lid for closing the open top of the body portion consisting of upper and lower plys cemented together except at the intermediate portion and thus defining a pocket, and a dispensing utensil in the pocket.

3. A container comprising a hollow body portion closed at the bottom, a removable top lid for closing the open top of the body portion consisting of a lower and upper layer, the latter being outwardly and upwardly deformed at its intermediate portion for forming with the lower layer a pocket having an end opening outwardly of the edge of the lid, and a dispensing utensil in the pocket.

4. A container comprising a hollow body portion including a bottom, a removable lid for closing the open top of the body portion formed by a lower and upper layer cemented together except at an intermediate portion, the outline of such portion being perforated, for forming a pocket having an end opening outwardly of the edge of the lid, and a dispensing utensil in the pocket.

5. A container comprising a hollow body portion including a bottom, a lid for closing the open top end of the container and having an upwardly extending finger tab located at a portion of its periphery and a pocket in substantially diametrical alignment therewith and opening outwardly of the periphery of the lid at the end thereof remote to said tab, and a dispensing utensil in the pocket.

6. A container comprising a hollow body portion closed at the bottom and having a slot parallel to and adjacent its upper, open end, a lid for the upper end having a pocket opening outwardly of its periphery, and a dispensing utensil in the pocket and having a handle end projecting through the open end of the pocket and through the slot.

LeROY S. SAYRE.

REFERENCES CITED

The following references are of record in the file of this patent:

UNITED STATES PATENTS

| Number | Name | Date |
|--------|------|------|
| 891,878 | Thatcher | June 30, 1908 |
| 1,734,477 | Fowle | Nov. 5, 1929 |
| 1,657,325 | Suttle | Jan. 24, 1928 |
| 1,607,865 | Butler | Nov. 23, 1926 |
| 1,257,057 | White | Feb. 19, 1918 |
| 1,687,678 | Mallory | Oct. 16, 1928 |